United States Patent [19]
Scura

[11] Patent Number: 5,829,314
[45] Date of Patent: Nov. 3, 1998

[54] DEVICE FOR REDUCING CABLE FLOP

[76] Inventor: Brian Scura, 1514 Valley Ave., Baker City, Oreg. 97814

[21] Appl. No.: 706,740

[22] Filed: Sep. 9, 1996

[51] Int. Cl.[6] ............................. F16C 1/10; B62L 1/00; B62L 1/12

[52] U.S. Cl. ................ 74/502.4; 24/502.6; 24/500.5; 24/501.5 R; 188/24.21; 188/24.11

[58] Field of Search ............................. 74/500.5–502.6, 74/471; 188/24.15–24.19, 24; 192/35, 2 D

[56] References Cited

U.S. PATENT DOCUMENTS

| | | | |
|---|---|---|---|
| 2,865,220 | 12/1958 | Bayley | 74/471 |
| 3,782,507 | 1/1974 | Shreve | 188/2 D |
| 3,845,847 | 11/1974 | Camp | 192/3 S |
| 3,942,609 | 3/1976 | Hill | 188/24 |
| 4,057,127 | 11/1977 | Woodring | 188/24 |
| 4,480,720 | 11/1984 | Shimano | 188/24.15 |
| 4,773,510 | 9/1988 | Sato | 188/24.16 |
| 5,431,256 | 7/1995 | Wen | 188/24.19 |
| 5,484,032 | 1/1996 | Li | 74/502.6 |
| 5,560,260 | 10/1996 | Kuo | 74/502.4 |

OTHER PUBLICATIONS

Taiwan Patent Gazette, p. 361 (Dec. 16, 1987).
Primo Perverted Gyro Converter Advertisement (Jun./Jul. 1996).
Schematic of Primo Perverted Gyro Converter (drawn by SCURA on Nov. 12, 1996).

*Primary Examiner*—Vinh T. Luong
*Attorney, Agent, or Firm*—Lyon & Lyon LLP

[57] ABSTRACT

A device for eliminating cable flop, for use with bicycle brake cable detanglers used on "trick" bicycles, includes a first cable to which is connected an anchor or cylindrical member. The anchor is secured within an anchor housing. Also secured within the anchor housing, and extending away from the anchor housing in a direction opposite the first cable are two other cables with anchors. The two cables opposing the first cable are rotatably secured in the anchor housing whereby the cables can move laterally with respect to each other to reduce "flop" in the cable detangler.

17 Claims, 6 Drawing Sheets

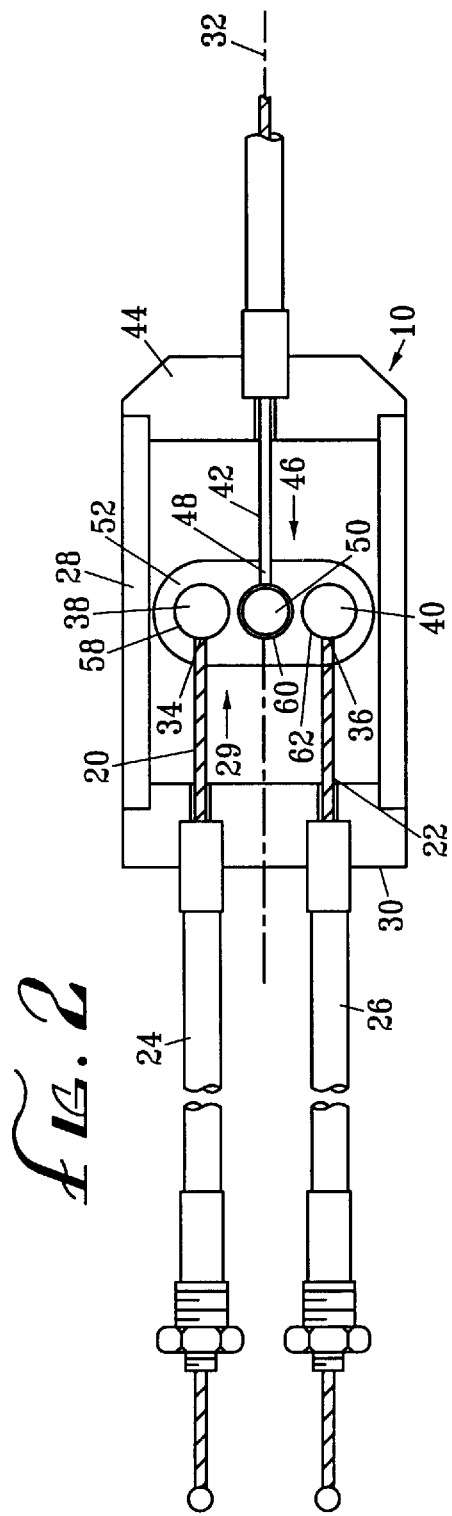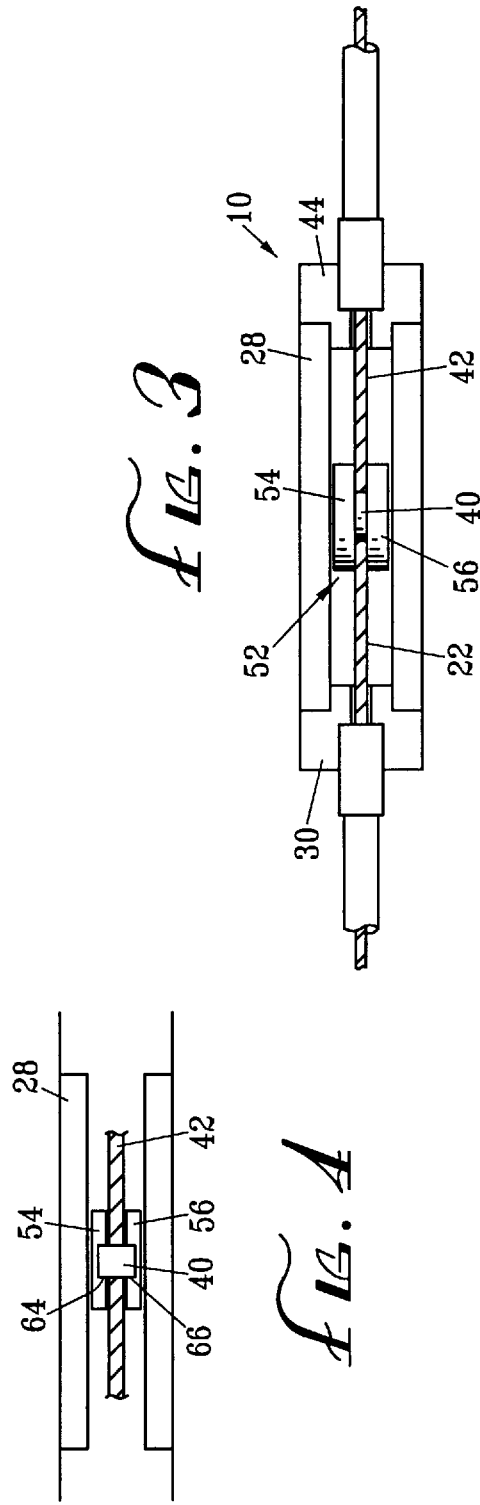

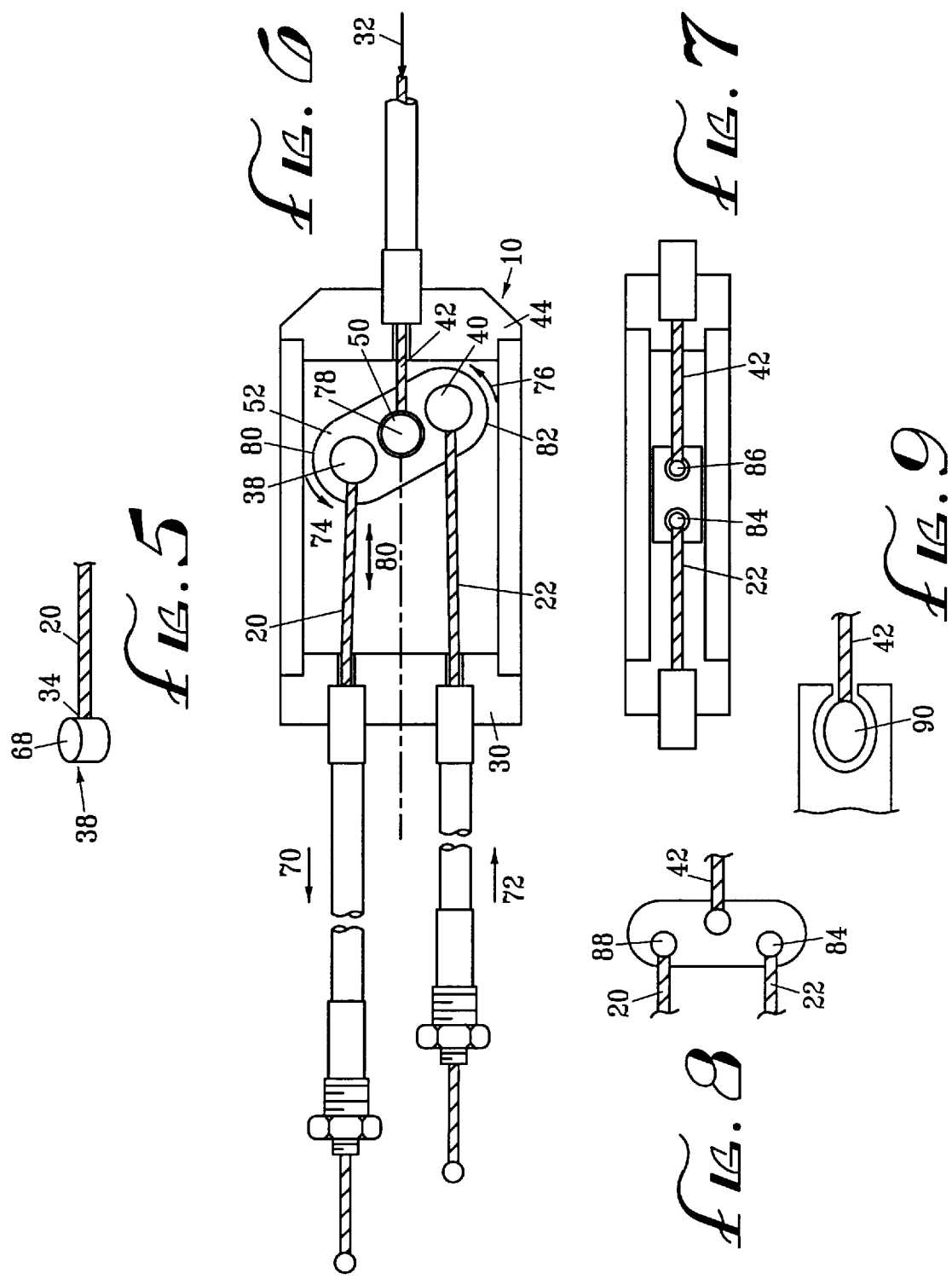

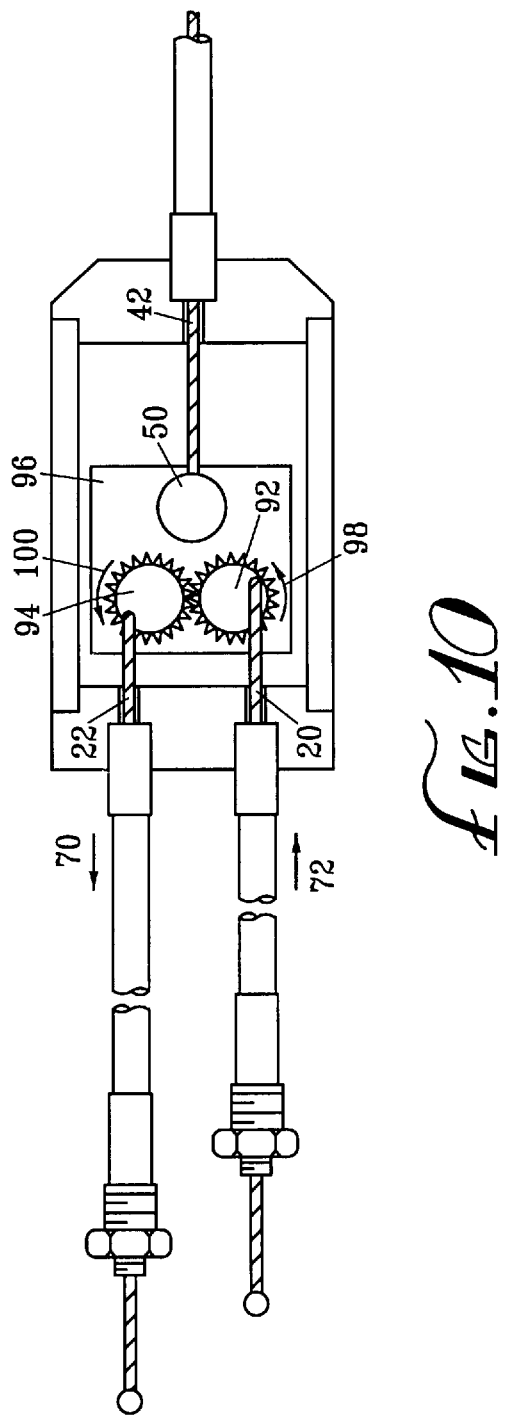

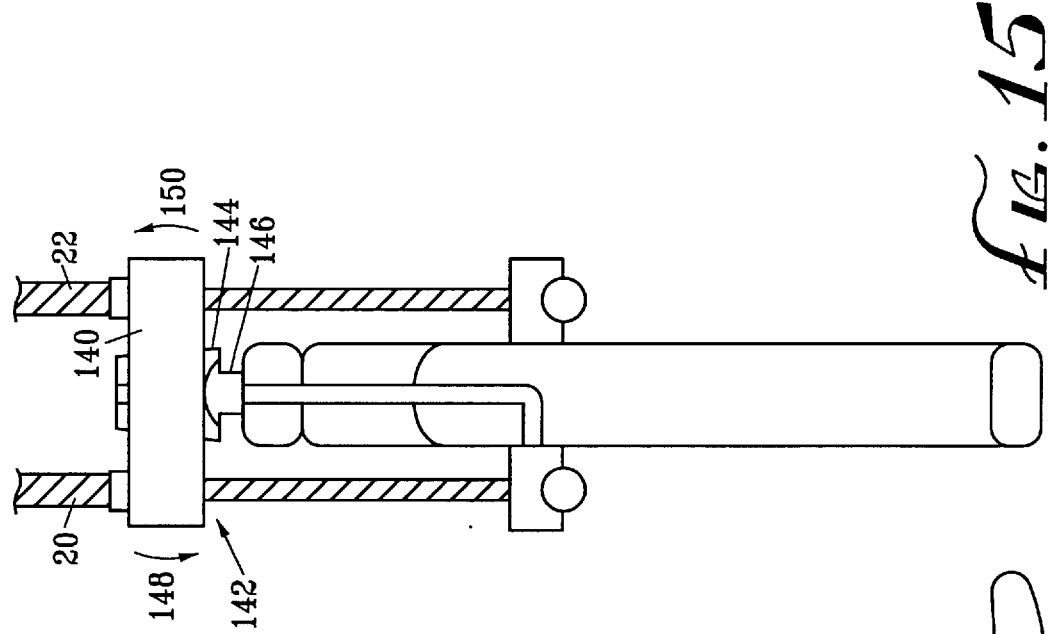
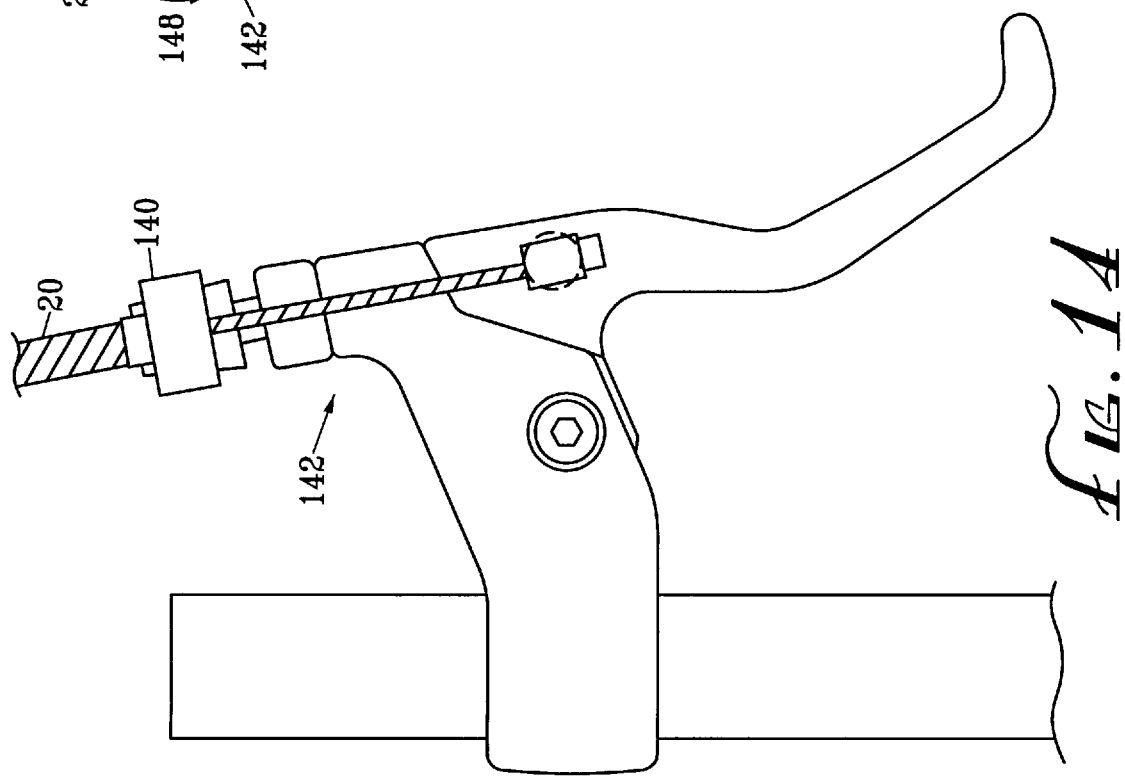

DEVICE FOR REDUCING CABLE FLOP

BACKGROUND OF THE INVENTION

1. Field of the Invention

The field of the invention is cabling systems.

2. Background Information

Recent attention has been directed to improving bicycles and devices and systems used on bicycles for purposes of "trick" riding. Trick riding involves performing stunts, unusual, difficult, and sometimes dangerous maneuvers on bicycles. A trick commonly performed involves spinning the bicycle handlebars while keeping the front wheel of the bicycle off the ground. Many trick bicycles, however, employ a hand brake system for the rear wheels. The hand brake is located on the handlebars and is cabled to a brake shoe system on the rear wheel.

Obviously, a cable connected directly from the handlebars to the rear wheel brake system would become tangled after a relatively small number of turns of the handlebars. To alleviate this tangling, cable detangler systems were developed. One such cable detangler system is manufactured by Scura Speed & Technology, 1514 Valley Ave., Baker City, Oreg. 97814. Cable detangler systems sometimes include a bearing mechanism which decouples the cable attached to the hand brake from the cable, or cables, attached to the brake shoes. In this system, the single cable from the brake lever on the handle bars is split to two upper cables which are attached to either side of the upper unit in the bearing assembly. Two lower cables are in turn attached to the bottom unit of the bearing assembly, and those two cables are then reduced to a single cable which runs to the rear brake shoe assembly. As the handlebar brake lever is activated, the upper cables pull the upper unit upward, thus pulling on the lower unit, which in turn pulls on the two lower cables, causing the brake shoe assembly to actuate. Through the use of such a cable detangler, the handle bars may be rotated indefinitely without any cable tangling.

Some cable detanglers, however, suffer from various drawbacks. To assure proper fit of the bearing mechanism, the cables included in the cable detangler should desirably be manufactured to precise tolerances and the cable detangler should be installed with a high degree of precision. Due to limitations in the ability to manufacture cables to extremely precise tolerances, design flaws, and less than perfect installation techniques employed by relatively unsophisticated users, undesirable results in the use of cable detanglers sometimes result. Due partially to differences in cable lengths leading either to the bearing mechanism on the cable detangler, the bearing mechanism sometimes wobbles, or "flops", particularly when the handlebars are spun during a trick ride. This flopping impairs the spinning of the handlebars. This "flop" is a well-recognized problem in the industry.

Means of attempting to remedy these cable detangler problems include a modified cable splitter in which one cable is connected to a "floating" bar by one or more set screws within the splitter frame, such that the bar would be capable of a small amount of travel parallel to the cables. Extending away from the bar in a direction opposite the cable are two other cables also connected to the bar by set screws. This modified splitter provided some improvement, but the "floating" bar was not designed to pivot to compensate for differences in the lengths of cable detangler cables, and still did not provide for movement of the lower cables relative to one another. Thus, the "flop" was not fully eliminated. Moreover, these cables connected by set screws sometimes become frayed and worn by contact with the set screws. The cables may become loose and require precise readjustment, or replacement. These cable splitters also often require the use of special tools, including small allen wrenches, that some users and mechanics do not have.

Therefore, a need was perceived for a cable splitter that would substantially eliminate the "flop", would not become quickly worn or frayed, and would not require periodic readjustment.

SUMMARY OF THE INVENTION

The present invention is directed to an apparatus which tends to reduce and substantially eliminate the flopping action of bicycle cable detanglers. A device having features of the present invention comprises an anchor platform pivotally mounted on a bicycle. Cables leading to the cable detangler system are anchored to the anchor platform. The pivotal mounting of the anchor platform permits the cables leading to the cable detangler system to move differentially with respect to each other to reciprocally compensate for "flop" in a cable detangler.

Accordingly, it is an object of the present invention to provide a device that substantially reduces the flopping action of bicycle cable detanglers. Other and further objects and advantages will appear hereinafter.

BRIEF DESCRIPTION OF THE DRAWINGS

It is to be understood that the accompanying drawings are provided for the purpose of illustration only, and are not intended as a definition of the limits of the invention. The drawings schematically illustrate a preferred embodiment of the present invention in which:

FIG. 2 is a partial cutaway plan view of a preferred embodiment of a cable splitter employing the present invention;

FIG. 3 is a partial cutaway elevation view of the preferred embodiment of FIG. 2;

FIG. 4 is a partial cutaway elevation view of another preferred embodiment of a cable splitter employing the present invention;

FIG. 5 is a perspective view of an anchor of the preferred embodiment of FIG. 2;

FIG. 6 is a partial cutaway plan view of the preferred embodiment of FIG. 2 illustrating an anchor housing in a rotated position;

FIG. 7 is a partial cutaway elevation view of another preferred embodiment of a cable splitter employing the present invention;

FIG. 8 is a partial cutaway plan view of the preferred embodiment of FIG. 7;

FIG. 9 is a partial cutaway elevation view of another preferred embodiment of an anchor and anchor housing of a cable splitter employing the present invention;

FIG. 10 is a partial cutaway plan view of another preferred embodiment of a cable splitter employing the present invention;

FIG. 14 is a top plan view of a brake lever assembly attached to a bicycle handle bar, and which incorporates another preferred embodiment of the present invention; and FIG. 15 is an elevation view of the brake lever assembly and preferred embodiment of FIG. 14.

DETAILED DESCRIPTION OF THE PREFERRED EMBODIMENT

Figure 1:
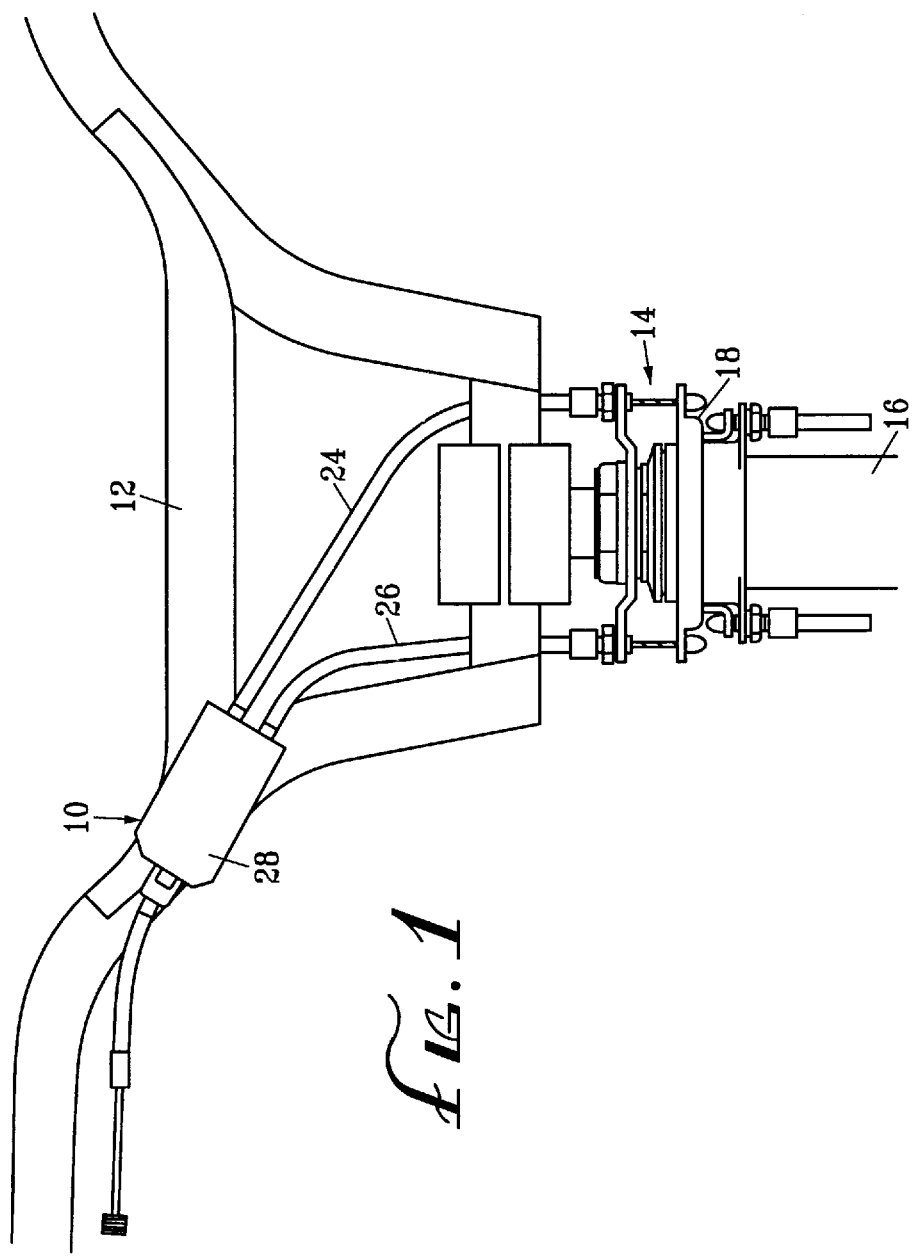
FIG. 1 is a partial cutaway view of a bicycle employing a cable splitter and a cable detangling system with which the present invention would primarily be used.

Turning in detail to the drawings, FIG. 1 illustrates a preferred embodiment of a device for reducing cable flop, in the form of a cable splitter 10 mounted on a bicycle 12 equipped with a bicycle cable detangler system 14. Bicycle cable detangler systems 14 are well known in the art and are used by bicycle "trick" riders. Such cable detangler systems allow the handlebars of a bicycle to spin without causing tangling of brake cables. Bicycle cable detangler systems 14, such as the one depicted, typically employ a bearing mechanism 18 mounted on a steering assembly 16 or other location on a bicycle 12. Such cable detangler systems will not be described further herein, except as relevant to aid understanding of the preferred embodiments of the cable splitter 10.

Turning now to the details of a preferred embodiment of cable splitter 10, as seen in FIG. 2, a pair of bicycle brake cables 20 and 22, partially covered by cable sheathings, 24 and 26, respectively, extend into a casing 28, through a first end 30 of the casing 28, and in a first direction 29 approximately parallel to a longitudinal axis 32 of the casing 28. The casing 28 is typically made of plastic, metal, or another durable substance. Bicycle brake cables 20 and 22 are well known in the art. Each cable 20, 22, has an end 34, 36, respectively, to which is connected an anchor, 38 and 40, respectively. The anchors, 38, 40 are typically made of metal, plastic, or another durable substance and may be connected to the ends 34 and 36, respectively, by any of a number of means well known in the art, such as die-molding, die-casting, or welding.

A third cable 42 also extends into the casing 28, through a second casing end 44, and in a second direction 46, substantially parallel to the longitudinal axis 32 and opposite the first. Direction 46 is substantially opposite direction 29. However, divergence of several degrees is acceptable, but only up to a point where cable splitter 10 is no longer stable when cables 20, 22 and 42 are displaced. Similarly to the first and second cables 20, 22, the third cable 42 has an end 48, attached to which is an anchor 50.

The anchors 38, 40 and 50 are securely engaged in an anchoring platform, such as an anchor housing 52. Anchor 50 is engaged in the anchor housing 52 at a location approximately equidistant from anchors 38 and 40, such that the anchor housing 52 is stable when the cables 20, 22, and 42 are displaced. In the preferred embodiment, anchor 50 is located approximately at the midpoint of a line defined by anchors 38 and 40. In the preferred embodiment shown in FIGS. 2 and 3, the anchor housing 52 comprises two plates 54 and 56 and is typically made of plastic, metal, or another durable substance. The anchor housing 52 shown defines recesses 58, 60 and 62, into which the anchors 38, 50 and 40 extend. While the recesses 58, 60 and 62 of FIGS. 2 and 3 form cutouts extending all the way through the plates 54 and 56, as shown in FIG. 4, recesses 64 and 66 may also be employed which do not extend all the way through plates 54 and 56. Anchor housing 52 can also comprise only one plate, or a plurality of plates.

As shown in detail in FIG. 5, in a preferred embodiment, a rotatable anchor 38 may have a cylindrical shape, as embodied by anchor 68. This cylindrical shaped anchor 68 allows for rotation of the anchor during use of the cable splitter 10.

During use, typically as the bicycle 12 handlebars are spinning, the bearing mechanism 18 of the cable detangler system 14 may tend to wobble, or "flop", inducing a swashing action in the bearing mechanism 18. In response to this tendency, as depicted in FIG. 6, the cables 20 and 22 tend to reciprocally compensate for the swashing, with a piston-like, differential motion action, as shown by arrows 70 and 72 respectively. As the cables 20, 22 tend to reciprocally compensate, the anchor housing 52 tends to rotate in the direction of the respective arrows 74 and 76 about a pivot point 78 established by anchor 50, facilitating the piston-like, differential motion action. Similarly, as the handlebars continue spinning, the differential motion of the cables 20 and 22 reciprocates in a direction opposing respective arrows 74 and 76. Thus, the anchor housing 52 and anchors 38 and 40 rotate relative to each other. To further facilitate the rotation of the anchor housing 52, the anchor housing 52 may have curved, or partially curved extremities 80 and 82.

During use, the anchor housing 52 may also tend to move along the casing's 28 longitudinal axis 32, in the direction of arrow 80. The anchor housing is maintained within the casing 28 by casing ends 30 and 44. It should also be noted that, during use, as housing 52 rotates, cables 20 and 22 tend to bend inward towards the longitudinal axis 32. However, cables 20 and 22 still extend in from the anchor housing 52 in a direction substantially opposite the direction from which cable 42 extends.

While a preferred embodiment employs cylindrical anchors 68, such as shown in FIG. 5, other preferred embodiments may employ anchors of other shapes as well. For example, as shown in FIGS. 7 and 8, generally spherical anchors 84 and 86, and 88 may be employed. Additionally, as shown in FIG. 9, other generally spherical shaped anchors 90 may also be employed which are oblate spheroid, egg-shaped, or which vary in other respects from a highly spherical shape. Indeed, anchors 90 may be of any shape, curved to any degree in two or three directions.

Another preferred embodiment, shown in FIG. 10 employs different types of anchors 92 and 94 and anchor housing 96. Geared anchors 92 and 94 are positioned within anchor housing 96 so that the respective gears are enmeshed. Cables 20 or 22 are preferably rotatably mounted to anchors 92 and 94 by pins, rivets, or other means well known in the art to reduce bending of the cables 20 and 22, and, as the cables 20 and 22 tend to reciprocally compensate for flopping action, anchors 92 and 94, respectively, tend to rotate in anchor housing 96. As either anchor 92 and 94 rotates, the other enmeshed anchors 94 and 92 tend to rotate in the other direction, as shown by arrows 98 and 100, and vice-versa, facilitating the piston-like action, as shown by arrows 70 and 72.

While a preferred embodiment of the invention is shown in FIG. 1 as being placed in the upper cables of the detangler system, it will be recognized that it could be incorporated elsewhere within the system with equal effect. For example, it could be incorporated into the handlebar brake lever assembly, or into the bearing mechanism.

Figure 11:
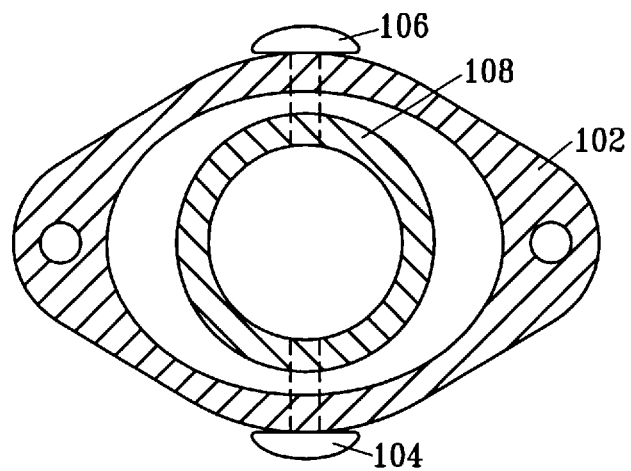
FIG. 11 is a top plan view of a preferred embodiment of a device for reducing cable flop.
Figure 12:
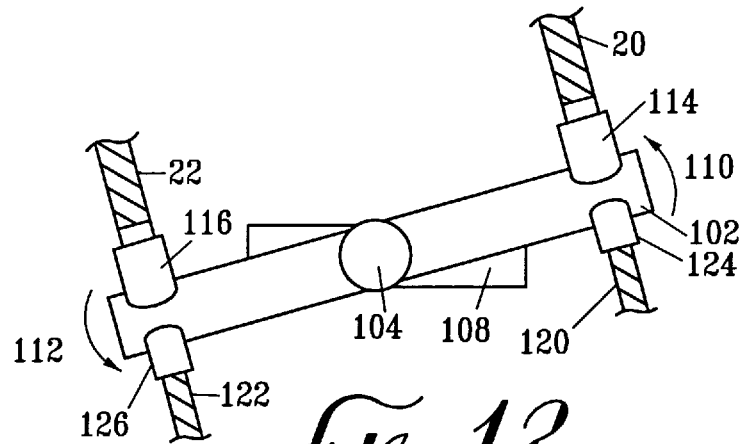
FIG. 12 is an elevation view of a preferred embodiment of the device of FIG. 11.
Figure 13:
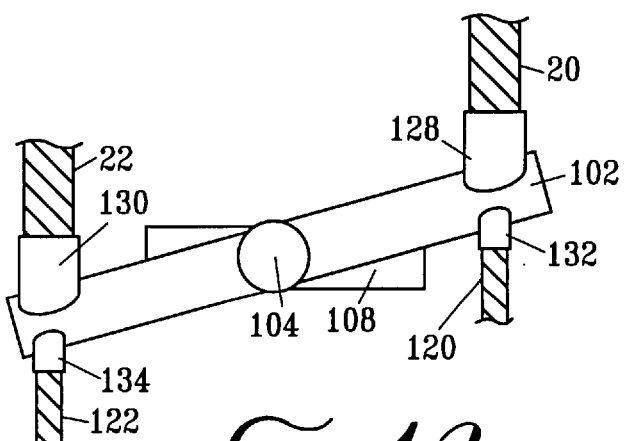
FIG. 13 is an elevation view of another preferred embodiment of the device of FIG. 11.

FIGS. 11–13 illustrate other preferred embodiments. An anchor platform 102 is pivotally mounted by pins 104 and 106, (or rivets, or any of a number of other means well known in the art,) to a washer 108. Washer 108 may be incorporated within the cable detangler's 14 bearing mechanism 18 of FIG. 1. Cables 20 and 22 are connected to the pivotable anchor platform 102. As the handlebars of the bicycle 12 incorporating this preferred embodiment are spun, the pivotable anchor platform 102 tends to move differentially, as shown by arrows 110 and 112 to reciprocally compensate for differences in the lengths of cables 20 and 22 and thereby reduce or eliminate cable flop. Again, it will be appreciated by those skilled in the art that, as the bicycle's 12 handlebars continue spinning, the pivotable anchor platform 102 tends to move differentially, opposite the direction of arrows 110 and 112, to compensate for differences in cable 20 and 22 lengths. To reach the location to which the length of cables 20 and 22 would extend if the pivotable anchor platform 102 were not present, extender cables 120 and 122 also extend from the pivotable anchor platform 102.

The cables 20, 22, and 120, 122 may be fixedly attached to pivotable anchor platform 102 by fixed anchors 114, 116, and 124, 126 respectively. In another preferred embodiment, as illustrated in FIG. 13, cables 20, 22, and 120, 122 may be rotatably attached to the pivotable anchor platform 102 by rotatable anchors 128, 130 and 132, 134, respectively. The use of rotatable anchors 128, 130, 132 and 134, in the preferred embodiment of FIG. 13 tends to reduce undesirable bending of cables 20, 22, 120 and 122.

While the preferred embodiments of FIGS. 11–13 may be incorporated as part of the detangler system 14 itself, it would be apparent to one skilled in the art that the preferred embodiments could be incorporated at any of a number of places on a bicycle 12. For example, the preferred embodiments of FIGS. 11–13 could be incorporated as attaching to the steering assembly 16 of the bicycle 12, in an upper cable assembly, a lower cable assembly, a brake lever assembly, or virtually any other place where a pivotable anchor platform 102 can be attached to two cables extending to or from the detangler system 14.

Another preferred embodiment shown in FIGS. 14–15 employs a pivotable anchor platform 140 in the brake lever assembly 142. The cables 20 and 22 extending to the detangler system 14 connect to the pivotable anchor platform 140. The pivotable anchor platform 140 contains a socket 144 which mates with and is pivotable about a hemisphere or cylinder 146 mounted in the brake lever assembly 142. As the bicycle 12 handlebars spin and differences in the length of cables 20 and 22 extending to the detangler 14 cause flop, the pivotable anchor platform 140 tends to move differentially in the direction of arrows 148 and 150, and vice-versa, to reciprocally compensate and reduce or eliminate cable flop.

Thus, a device for reducing cable flop has been disclosed. While variations of the illustrated preferred embodiment have been shown and described, it would be apparent to those skilled in the art that many more modifications are possible without departing from the inventive concepts herein. The invention, therefore, is not to be restricted except in the spirit of the appended claims.

I claim:

1. A device for eliminating cable flop, comprising:
   a first cable having a first end;
   a first anchor connected to the first end;
   an anchor housing rotatably engaging said first anchor;
   a second cable having a second end;
   a second anchor connected to the second end, said second anchor being rotatably engaged in said anchor housing;
   a third cable having a third end; and
   a third anchor connected to the third end, said third anchor being rotatably engaged in said anchor housing at a location approximately equidistant from said first and second anchors.

2. The device of claim 1, wherein two of said cables extend in a first direction from said anchor housing and said third cable extends from said anchor housing in a second direction substantially opposite said first direction.

3. The device of claim 2, wherein said third anchor is rotatably engaged in said anchor housing at approximately the midpoint of a line defined by said first and second anchors.

4. The device of claim 3, further comprising a casing having two casing ends and a longitudinal axis, wherein said casing encompasses said anchor housing and said casing ends limit movement of said anchor housing along the longitudinal axis between the casing ends.

5. The device of claim 1, further comprising a casing having two casing ends and a longitudinal axis, wherein said casing encompasses said anchor housing and said casing ends limit movement of said anchor housing along the longitudinal axis between the casing ends.

6. The device of claim 5, wherein said anchor housing comprises at least one plate defining recesses to rotatably engage at least two of said anchors.

7. The device of claim 6, wherein said plates include partially curved extremities.

8. The device of claim 1, wherein at least two of said anchors comprise cylindrical members.

9. The device of claim 1, wherein at least two of said anchors comprise generally spherical members.

10. The device of claim 1, wherein said anchor housing comprises at least one plate defining recesses to rotatably engage at least two of said anchors.

11. The device of claim 10, wherein said plates include partially curved extremities.

12. A device for eliminating cable flop, comprising:
    at least three brake cables, each of said cables having an end;
    at least three rounded members, each of said rounded members being connected to the end of one of said brake cables,
        wherein one of said rounded members is approximately equidistant from the other two of said rounded members; and
    at least one plate, said plates defining partially curved extremities and at least three rounded recesses sized to engage said rounded members,
        wherein said plates rotatably engage said rounded members.

13. The device of claim 12, wherein two of said cables extend in a first direction from said plates and said third cable extends from said plates in a second direction substantially opposite said first direction.

14. The device of claim 12, further comprising a casing having two casing ends and a longitudinal axis, wherein said casing encompasses said plates and said casing ends limit movement of said plates along the longitudinal axis between the casing ends.

15. The device of claim 12, wherein said rounded members are cylindrical.

16. The device of claim 12, wherein said plates comprise two plates and said cables are locatd between said plates.

17. A device for eliminating cable flop, comprising:
    at least three brake cables, each of said cables having an end;

at least three anchors, each of said anchors being connected to the end of one of said brake cables;

a pair of plates comprising at least three recesses sized to rotatable engage said anchors, each of said plates including partially curved extremities,
  wherein said plates engage said anchors with said cables being located between said plates,
    two of said cables extend in a first direction from said plates and the third cable extends from said plates in a second direction substantially opposite said first direction, and
    the anchor attached to the third cable is rotatable engaged by said plates at approximately the midpoint of a line defined by the other two anchors; and a casing having two casing ends and a longitudinal axis,
  wherein said casing encompasses said plates and said casing ends limit movement of said plates along the longitudinal axis between the casing ends.

* * * * *

UNITED STATES PATENT AND TRADEMARK OFFICE
CERTIFICATE OF CORRECTION

PATENT NO. : 5,829,314
DATED : November 3, 1998
INVENTOR(S) : Cotichini et al.

It is certified that error appears in the above-identified patent and that said Letters Patent is hereby corrected as shown below:

Column 3, line 31, after "20" and before "22" insert – and --.
Column 3, line 31, after "34" and before "36" insert – and --.
Column 3, line 40, after "axis 32" delete – and opposite the first --.
Column 4, line 35, after "84" delete – and – and insert -- , --.

Signed and Sealed this

Fourteenth Day of September, 1999

Attest:

Q. TODD DICKINSON

*Attesting Officer*      *Acting Commissioner of Patents and Trademarks*

UNITED STATES PATENT AND TRADEMARK OFFICE
CERTIFICATE OF CORRECTION

PATENT NO  :  5,829,314
DATED      :  November 3, 1998
INVENTOR(S) : Scura

It is certified that error appears in the above-identified patent and that said Letters Patent is hereby corrected as shown below:

Column 3, line 31, after "20" and before "22" insert -- and --.

Column 3, line 31, after "34" and before "36" insert -- and --.

Column 3, line 40, after "axis 32" delete -- and opposite the first --.

Column 4, line 35, after "84" delete -- and -- and insert -- , --.

This certificate supersedes Certificate of Correction issued September 14, 1999.

Signed and Sealed this

Thirtieth Day of November, 1999

Attest:

Q. TODD DICKINSON

Attesting Officer

Acting Commissioner of Patents and Trademarks